(12) United States Patent
Hay et al.

(10) Patent No.: US 7,681,432 B2
(45) Date of Patent: Mar. 23, 2010

(54) CALIBRATING FORCE AND DISPLACEMENT SENSORS OF MECHANICAL PROBES

(75) Inventors: Jennifer Hay, Knoxville, TN (US); Warren Oliver, Knoxville, TN (US)

(73) Assignee: Agilent Technologies, Inc., Santa Clara, CA (US)

( * ) Notice: Subject to any disclaimer, the term of this patent is extended or adjusted under 35 U.S.C. 154(b) by 587 days.

(21) Appl. No.: 11/609,523

(22) Filed: Dec. 12, 2006

(65) Prior Publication Data
US 2008/0134748 A1 Jun. 12, 2008

(51) Int. Cl.
*G01B 3/30* (2006.01)
(52) U.S. Cl. ......................................... 73/1.79; 73/1.89
(58) Field of Classification Search .................. 73/1.89, 73/1.79
See application file for complete search history.

(56) References Cited

U.S. PATENT DOCUMENTS

| | | | |
|---|---|---|---|
| 4,631,834 A | 12/1986 | Hayashi et al. | |
| 4,848,141 A | 7/1989 | Oliver et al. | |
| 4,899,600 A * | 2/1990 | Lee | 73/862.626 |
| 5,261,266 A * | 11/1993 | Lorenz et al. | 73/1.15 |
| 6,176,117 B1 * | 1/2001 | Chen et al. | 73/1.15 |
| 6,679,124 B2 | 1/2004 | Oliver | |
| 6,694,797 B2 * | 2/2004 | Luik | 73/1.79 |
| 2002/0138999 A1 * | 10/2002 | Dubois | 33/502 |

FOREIGN PATENT DOCUMENTS

EP 1260789 11/2002

OTHER PUBLICATIONS

J. R. Pratt, D. T. Smith, D. B. Newell, J. A. Kramar and E. Whitenton, "Progress toward Systeme International d'Unites traceable force metrology for nanomechanics", National Institute of Standards and Technology, Maryland. 2003.

* cited by examiner

*Primary Examiner*—Robert R Raevis

(57) ABSTRACT

Concepts presented herein relate to a portable device that includes a frame and a fixture for engaging a mechanical probe to be calibrated. The fixture can be a platform of hard material that receives pushing action of the mechanical probe. A displacement sensor senses position of the platform with respect to the frame. An actuator is coupled to the displacement sensor and a controller is coupled to the actuator. The controller operates the actuator to cause the platform to move to a position (as indicated by the displacement sensor), while the force required to cause the displacement is measured with a force sensor.

30 Claims, 2 Drawing Sheets

CALIBRATING FORCE AND DISPLACEMENT SENSORS OF MECHANICAL PROBES

BACKGROUND

The discussion below is merely provided for general background information and is not intended to be used as an aid in determining the scope of the claimed subject matter.

Mechanical probes are used in a variety of different systems such as micro-manipulators, profilometers used in atomic force microscopes (AFMs), and hardness testers. The utility of such probes depends on the accuracy to which the force and displacement calibrations are known. These calibrations may depend on probing frequency, temperature, humidity, and other factors. Currently, multiple devices are used in the calibration of such probes. For example, the force calibration may be determined by balancing the probe against reference weights, while the displacement calibration may be determined using laser interferometry or step-height standards.

SUMMARY

Concepts presented herein relate to a portable device that includes a frame and a fixture for engaging a mechanical probe to be calibrated. The fixture can be a platform of hard material that receives pushing action of the mechanical probe. A displacement sensor senses position of the platform with respect to the frame. An actuator is coupled to the displacement sensor and a controller is coupled to the actuator. The controller operates the actuator to cause the platform to move to a position (as indicated by the displacement sensor), while the force required to cause the displacement is measured with a force sensor.

A method is provided for using the portable device to perform force calibration for a mechanical probe. The method includes holding the platform in a fixed position while the mechanical probe applies force to the platform. The force sensor of the device measures the force required to balance the action of the mechanical probe, thereby allowing a force calibration for the mechanical probe. The method is repeated for one or more positions of the platform, there by allowing force calibration as a function of probe position.

Another method is provided for using the device to determine the displacement calibration for a mechanical probe. The method includes moving the platform to a series of positions while the mechanical probe applies a constant force to the platform such that contact between the mechanical platform and the probe is maintained. To minimize effects from electronic and thermal drift, motion of the platform can be cyclical while changing amplitude of the motion.

Yet another method is provided for using the device to determine stiffness of a mechanical probe. This method assumes that the force and displacement sensors of the mechanical probe are well calibrated through the use of conventional methods or other means, including those described herein. The method includes holding the platform in a fixed position and using the mechanical probe to apply a series of forces. Since the device is statically rigid, any displacement sensed by the mechanical probe is due to compliance of the probe itself and/or its supporting frame. The stiffness of the probe can be determined as the relationship between force applied by the mechanical probe and displacement sensed by the mechanical probe.

The Summary and Abstract are provided to introduce some concepts in a simplified form that are further described below in the Detailed Description. The Summary and Abstract are not intended to identify key features or essential features of the claimed subject matter, nor is it intended to be used as an aid in determining the scope of the claimed subject matter.

BRIEF DESCRIPTION

DETAILED DESCRIPTION

Figure 1:
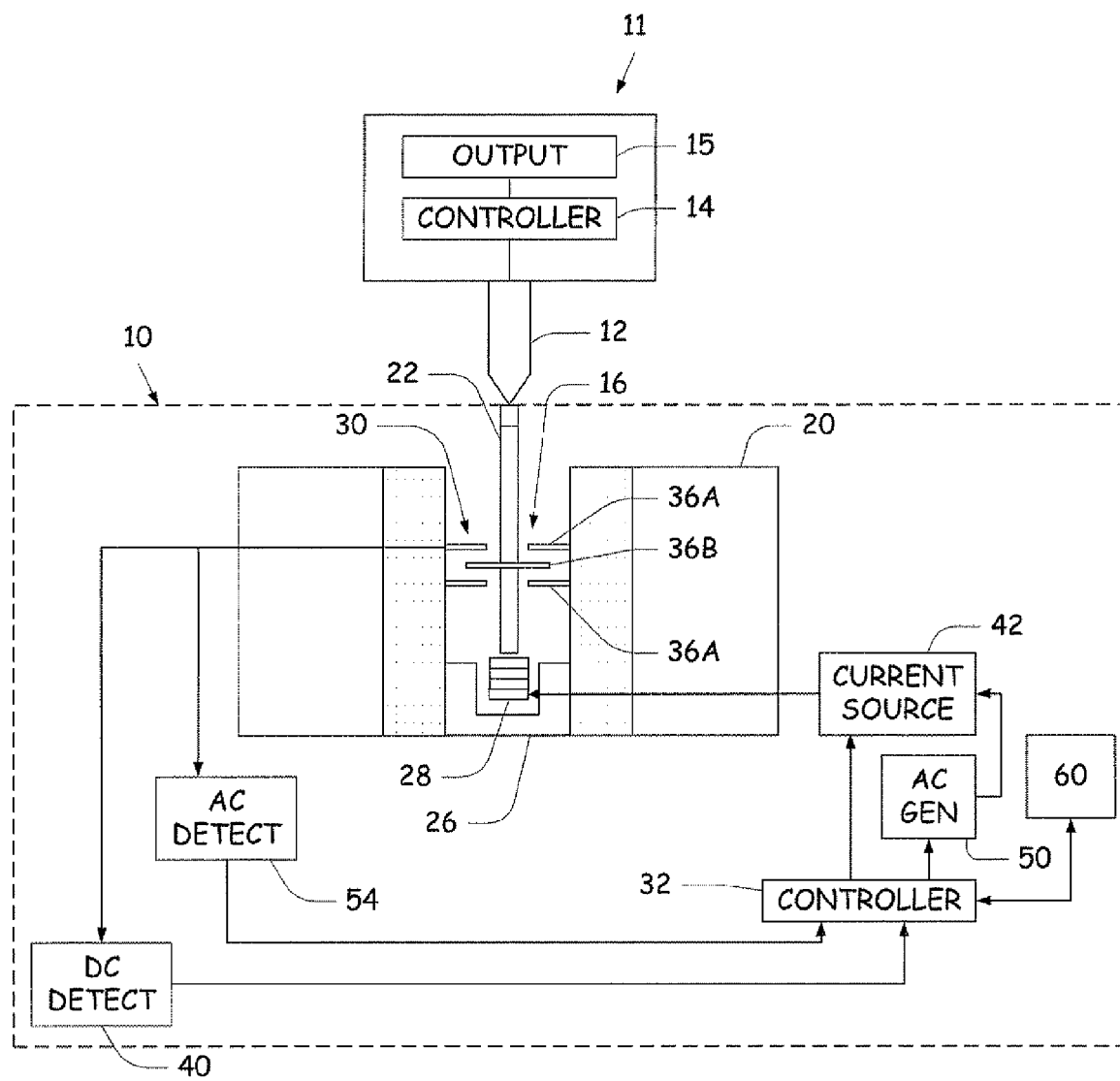
FIG. 1 is a schematic view of an environment using a calibration device.

A calibration device 10 for calibrating a system 11 having a mechanical probe 12 is illustrated in FIG. 1. Probe 12 is coupled to a controller 14 that actuates probe 12 and provides an output 15 indicative thereof. Output 15 can be a force and/or a displacement measurement of probe 12. System 11 can be any type of system that utilizes a mechanical probe. These systems include micro-manipulators, atomic force microscopes and hardness testers. An exemplary hardness tester is described in U.S. Pat. No. 4,848,141, the contents of which are hereby incorporated by reference in their entirety.

Device 10 can be provided in a suitable enclosure (illustrated in dashed lines) that includes one or more of the components described below. In one embodiment, the enclosure is portable to allow easy transfer from one probe to another probe. If desired, the enclosure can include one or more ports to transfer information related to force and/or displacement detection to a computing device.

Device 10 includes a load-controlled, displacement sensing (LCDS) assembly 16 coupled to a frame 20 that is used to measure loads applied to the probe and/or provide a load to the probe 12. As such, the LCDS assembly 16 is coupled to a fixture 22 and configured to control the fixture 22. In one embodiment, fixture 22 includes a platform for engaging probe 12. The platform can be made of a hard material so as to prevent substantial deformation thereof when engaged with probe 12.

The LCDS assembly 16 includes a permanent magnet 26 mounted in the frame 20, a coil 28 and a displacement sensor 30. A controller 32 controls current to the coil 28. The controller 32 receives feedback signals from the displacement sensor 30. Displacement refers to a change in position or to a position relative to a known position. The LCDS assembly 16 can also take other forms such as a piezoelectric assembly, rather than the electromagnetic assembly herein illustrated. The force sensor (which measures current to coil 28) and displacement sensor 30 are calibrated using traditional means. For example, the force sensor may be calibrated using reference weights, and the displacement sensor 30 may be calibrated using laser interferometry.

The displacement sensor 30 is provided in order to provide feedback to the controller 32, which in turn provides current to the coil 28. The displacement sensor 30 senses the position of the fixture 22. In the embodiment illustrated, the displacement sensor 30 comprises a capacitive sensor having a pair of fixed, stationary plates 36A with a movable plate 36B located therebetween. The movable plate 36B is coupled to fixture 22. Displacement of the fixture 22 is measured by the displacement sensor 30, the output of which is connected to a DC displacement detector 40. The detector 40 digitizes the DC displacement signal, which is provided to the controller 32.

The controller 32 controls a current source 42 that provides current to the coil 28. Current can be provided to the coil 28 in order that the displacement sensor 30 be maintained substantially in a fixed position. Current can also be provided to move fixture 22 through a plurality of known positions.

In addition, or alternatively, an oscillating load can also be provided. The oscillating load can be provided by superimposing an alternating current (AC) onto the drive current applied to the coil 28. The frequency of the oscillating force applied is typically in the range of from 0.5 to 200 Hz; however, depending on the design of the LCDS assembly 16, the concept can work from about 0.5 Hz to 1 MHz. The amplitude of the oscillating force may be in the range of from about $10^{-10}$ to 1 Newton, although forces less than or greater than this range can also be provided.

In FIG. 1, an AC signal generator 50 under control of the controller 32 injects or superimposes an AC signal into the output current signal of the current source 42. An AC displacement detector 54 detects the resulting AC displacement. The detector 54 may be a lock-in amplifier, which is tuned to measure the amplitude of the AC displacement at the applied frequency together with the phase of the displacement signal relative to the applied signal. The amplitude and phase signals are digitized by the detector 54 and provided to separate inputs of the controller 32 for analysis or storage in a mass storage device 60, along with the DC force and displacement, discussed above.

The device 10 decouples the load sensitivity from the load capacity by using the LCDS assembly 16. A suitable LCDS assembly 16 and capacitive displacement sensor 30 are available from the Nano Instruments Division of MTS Systems Corporation of Eden Prairie, Minn. Control of the load coil 28 and feedback from sensor 40 can be similar to that described in U.S. Pat. No. 6,679,124, the contents of which are hereby incorporated by reference in their entirety.

In the embodiment illustrated, the displacement sensor 30 is a capacitive displacement sensor, as described above, wherein the fixture 22 is supported by very flexible leaf springs. Rather than depending on the deflection of a spring element in a conventional load cell in order to determine force, the device 10 is operated by using a feedback loop to maintain a known position of the fixture 22 by changing the current in the coil 28. This results in static rigidity (i.e., there is little or no deflection of the load mechanism associated with large forces placed by probe 12). As discussed above, the known position of the fixture 22 can remain substantially unchanged when only static loading is applied. Alternatively, when an oscillatory force is applied, the known position varies in time while the average position can remain substantially unchanged.

Device 10 can be utilized to calibrate devices that utilize a mechanical probe because it allows a simple calibration of both force and displacement in a single, portable unit. For example, measurements obtained by system 11, such as output 15, can be compared to measurements obtained by device 10. A number of factors are considered in a design optimized for both displacement and force calibration. One factor is mutual independence of mechanisms for actuation, force measurement, and displacement measurement. Another factor is linearity of the leaf springs supporting fixture 22. Yet another factor is the ability to move fixture 22 to more than one position.

Figure 2:
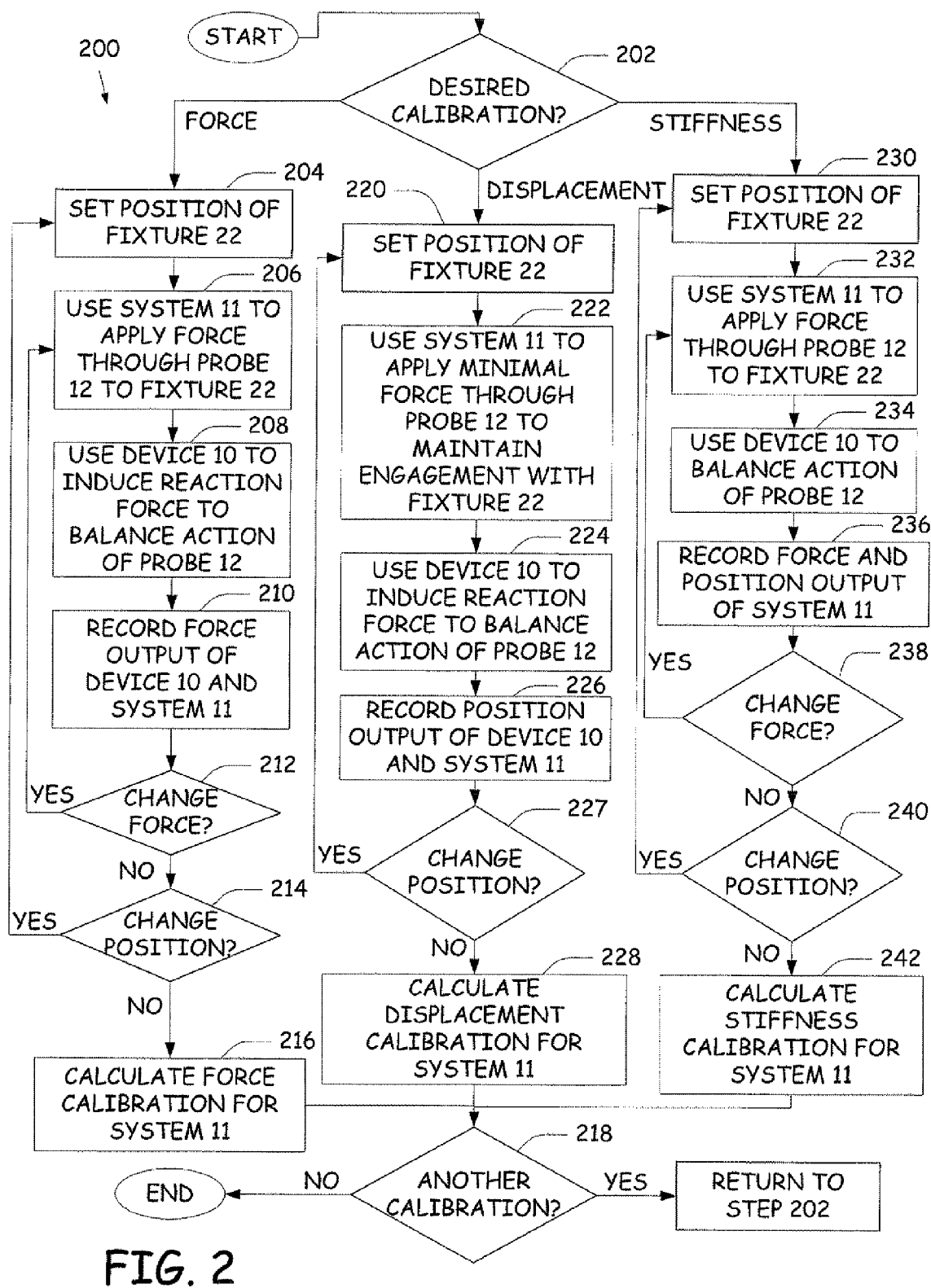
FIG. 2 is a flow chart of a method for analyzing a system with a calibration device.

FIG. 2 is a flow diagram of a method 200 for analyzing and calibrating system 11 that utilizes mechanical probe 12. At step 202, method 200 can proceed to calibrate force for system 11 (and thus proceed to step 204), calibrate displacement for system 11 (and thus proceed to step 220), and/or determine stiffness of probe 12 (and thus proceed to step 230).

Using device 10, one or more of the force calibration, the displacement calibration, and the stiffness determination can be performed as desired.

To calibrate force, method 200 proceeds from step 202 to step 204, wherein a position of fixture 22 is set as indicated by displacement sensor 30. At step 206, a force is applied through mechanical probe 12 to fixture 22. Action of probe 12 is balanced with device 10 by inducing a reaction force at step 208. A force output for device 10 and system 11 is recorded at step 210. An amount of current supplied to coil 28 is indicative of the force used to maintain fixture 22 in a known position. It can be decided at step 212 to change the force applied through probe 12 to fixture 22. If so, method 200 returns to step 206 to apply the new force, balance the action at step 208 and record force output at step 210. Otherwise, method 200 proceeds to step 214 to determine if a position should be changed. If a new position is desired, fixture 22 is controlled at a next known position, as indicated by the displacement sensor.

Method 200 can perform measurements for a new position by returning to step 204 and repeating steps 206, 208 and 210. This process can be repeated as desired for further known positions. Based on the measurements recorded in step 210, the force calibration can be determined for system 11 at step 216, for example by comparing outputs of system 11 and device 10. Method 200 then decides whether to provide additional calibration at step 218. If another calibration is desired, method 200 can then return to step 202 to provide further analysis of system 11.

To calibrate displacement for system 11, method 200 proceeds from step 202 to step 220. At step 220, a position of fixture 22 is set as measured by displacement sensor 30. At step 222, a minimal force through probe 12 is applied to maintain engagement with fixture 22. Device 10 is used to induce a reaction force to balance action of probe 12 at step 224. The position output of device 10 and system 11 is recorded at step 226. A determination is made to change the probe position at step 227. Method 200 can return to step 220 to set the position. Displacement for system 11 can be calibrated at step 228 from measurements recorded during step 226. For example, the displacement of fixture 22 (as known by displacement sensor 30) can be compared to displacement sensed by probe 12. Method 200 can then return to step 202 from step 218 if desired.

To determine stiffness of probe 12, method 200 proceeds from step 202 to step 230. At step 230, a position of fixture 22 is set. At step 232, a force is applied through probe 12 to fixture 22. At step 234, device 10 is used to balance the action of probe 12. Force and position output of system 11 can then be recorded at step 236. Step 238 determines whether additional forces should be applied at step 232 and step 240 determines whether additional positions for fixture 22 are needed for further measurements. At step 242, stiffness of probe 12 is calculated as the relationship between the force applied by probe 12 and displacement sensed by probe 12. This calculation may include accounting for displacement due to elastic or plastic deformation resulting from contact between the probe and the platform. Such displacement can be calculated independent of deformation in the probe itself.

Given method 200, device 10 provides a portable device in which force calibration, displacement calibration and determination of stiffness for a mechanical probe can be provided. Thus, multiple devices are not needed to provide an analysis of various systems of a mechanical probe.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device, comprising:
   a frame;
   a fixture moveable relative to the frame and including a surface adapted to engage a mechanical probe to be calibrated;
   a displacement sensor sensing a position of the fixture with respect to the frame;
   an actuator coupled to the fixture, and applying a force to the fixture;
   a controller coupled to the actuator and configured to operate the actuator to cause the fixture to move to at least two positions, and to determine the force applied to the fixture by the actuator in each of the positions.

2. The device of claim 1 wherein the fixture is a hard platform.

3. The device of claim 1 wherein the actuator comprises an electromagnetic coil coupled to a current source.

4. The device of claim 1 wherein the controller is adapted to provide an output indicative of the position of the fixture.

5. The device of claim 1 wherein the controller is adapted to cause the actuator to control the fixture at each of a plurality of target positions such that when a force is applied to the fixture, a difference between the sensed position and one of the plurality of target positions is substantially zero.

6. A device, comprising:
   a frame;
   a fixture moveable relative to the frame and including a surface adapted to engage a mechanical probe to be calibrated;
   a displacement sensor sensing a position of the fixture with respect to the frame; and
   an actuator coupled to the fixture;
   a controller coupled to the actuator and configured to operate the actuator to cause the fixture to move to at least two positions;
   wherein the displacement sensor is a capacitive sensor having a pair of fixed plates and a movable plate coupled to the fixture and positioned between the fixed plates.

7. A device, comprising:
   a frame;
   a fixture moveable relative to the frame and including a surface adapted to engage a mechanical probe to be calibrated;
   a displacement sensor sensing a position of the fixture with respect to the frame; and
   an actuator coupled to the fixture;
   a controller coupled to the actuator and configured to operate the actuator to cause the fixture to move to at least two positions;
   wherein the controller is adapted to cause the actuator to oscillate the fixture about a target position.

8. The device of claim 7 wherein the target position changes as a function of time.

9. A combination, comprising:
   a mechanical probe;
   a system controller coupled to the probe to cause actuation thereof; and
   a calibration device, comprising:
      a frame;
      a movable fixture;
      an actuator coupled to the fixture;
      a displacement sensor sensing a position of the fixture with respect to the frame; and
      a device controller coupled to the actuator and configured to operate the actuator to cause the fixture to move to at least two positions.

10. The combination of claim 9 wherein the probe is part of a system that includes one of a micro-manipulator, an atomic force microscope, and a hardness tester.

11. The combination of claim 9 wherein the fixture is a hard platform.

12. The combination of claim 9 wherein the actuator comprises an electromagnetic coil coupled to a current source.

13. The combination of claim 9 wherein the device controller is adapted to provide an output indicative of the position of the fixture.

14. The combination of claim 9 wherein the device controller is adapted to cause the actuator to control the fixture at each of a plurality of target positions such that when a force is applied to the fixture, a difference between the sensed position and one of the plurality of target positions is substantially zero.

15. A combination, comprising:
   a mechanical probe;
   a system controller coupled to the probe to cause actuation thereof; and
   a calibration device, comprising:
      a frame;
      a movable fixture;
      an actuator coupled to the fixture;
      a displacement sensor sensing a position of the fixture with respect to the frame; and
      a device controller coupled to the actuator and configured to operate the actuator to cause the fixture to move to at least two positions;
   wherein the device controller is adapted to cause the actuator to oscillate the fixture about a target position.

16. A combination, comprising:
   a mechanical probe;
   a system controller coupled to the probe to cause actuation thereof; and
   a calibration device, comprising:
      a frame;
      a movable fixture;
      an actuator coupled to the fixture;
      a displacement sensor sensing a position of the fixture with respect to the frame; and
      a device controller coupled to the actuator and configured to operate the actuator to cause the fixture to move to at least two positions;
   wherein the displacement sensor is a capacitive sensor having a pair of fixed plates and a movable plate coupled to the fixture and positioned between the fixed plates.

17. The combination of claim 15 wherein the target position changes as a function of time.

18. A method, comprising:
   providing a system having a mechanical probe;
   providing a device, separate from the system, the device having a fixture for engaging the mechanical probe;
   controlling, independent of the probe position, a position of the fixture among a plurality of positions along one spatial axis;
   applying a probe force with the mechanical probe to the fixture;
   sensing the probe force and displacement of the mechanical probe along the spatial axis using the system; and
   sensing a fixture force along the spatial axis.

19. The method of claim 18, wherein sensing the fixture force comprises measuring current through an electromagnetic coil.

20. The method of claim 18, wherein controlling a position comprises:
using a displacement sensor to sense a position of the fixture; and
applying the fixture force such that a difference between the sensed fixture position and a target fixture position is substantially zero.

21. A method, comprising:
providing a system having a mechanical probe;
providing a device having a fixture for engaging the mechanical probe;
controlling, a position of the fixture among a plurality of positions;
applying a probe force with the mechanical probe to the fixture;
sensing the probe force and displacement of the mechanical probe using the system; and
sensing a fixture force; and
further comprising:
calibrating the system based on a comparison of the probe force and the fixture force.

22. A method, comprising:
providing a system having a mechanical probe;
providing a device having a fixture for engaging the mechanical probe;
controlling, a position of the fixture among a plurality of positions;
applying a probe force with the mechanical probe to the fixture;
sensing the probe force and displacement of the mechanical probe using the system; and
sensing a fixture force; and
further comprising:
determining stiffness of the probe based on the probe force and displacement of the probe.

23. The method of claim 22 wherein determining stiffness comprises:
accounting for contact deformation between the mechanical probe and the fixture.

24. A method, comprising:
providing a system having a mechanical probe;
providing a device having a fixture for engaging the mechanical probe;
controlling, a position of the fixture among a plurality of positions;
applying a probe force with the mechanical probe to the fixture;
sensing the probe force and displacement of the mechanical probe using the system; and
sensing a fixture force,
wherein controlling a position further comprises:
using a capacitive displacement sensor having a pair of fixed plates and a movable plate coupled to the fixture and positioned between the pair of fixed plates.

25. A method, comprising:
providing a system having a mechanical probe;
providing a device having a fixture for engaging the mechanical probe;
controlling, a position of the fixture among a plurality of positions;
applying a probe force with the mechanical probe to the fixture;
sensing the probe force and displacement of the mechanical probe using the system; and
sensing a fixture force;
wherein controlling a position further comprises:
using an electromagnetic coil coupled to a current source to apply the fixture force.

26. A method, comprising:
providing a system having a mechanical probe;
providing a device, separate from the system, the device having a fixture for engaging the mechanical probe;
actuating the fixture to move through two or more positions along an axis;
applying a force with the probe to maintain contact between the probe and the fixture;
sensing position of the probe along the axis;
determining the force applied between the fixture and the probe along the axis; and
sensing position of the fixture along the axis.

27. The method of claim 26 and further comprising:
calibrating the system based on a comparison of
probe position sensed by the system and
fixture position sensed by the device.

28. A method for calibrating a system having a mechanical probe, the method comprising:
providing a device having a fixture for engaging the mechanical probe
actuating the fixture through two positions;
applying a force with the probe to maintain contact between the probe and the fixture;
sensing position of the probe; and
sensing position of the fixture,
wherein actuating the fixture comprises:
using an electromagnetic coil coupled to a current source to apply force to the fixture.

29. A method, comprising:
providing a system having a mechanical probe;
providing a device having a fixture for engaging the mechanical probe
actuating the fixture through two or more positions;
applying a force with the probe to maintain contact between the probe and the fixture;
sensing position of the probe; and
sensing position of the fixture;
wherein actuating the fixture comprises oscillating the fixture.

30. A method, comprising:
providing a system having a mechanical probe; providing a device having a fixture for engaging the mechanical probe
actuating the fixture through two or more positions;
applying a force with the probe to maintain contact between the probe and the fixture;
sensing position of the probe; and
sensing position of the fixture;
wherein sensing position of the fixture comprises:
using a capacitive displacement sensor having a pair of fixed plates and a movable plate coupled to the fixture and positioned between the pair of fixed plates.

* * * * *